United States Patent [19]

Cobb et al.

[11] 4,206,969
[45] Jun. 10, 1980

[54] DIRECTIONAL FRONT PROJECTION SCREEN

[75] Inventors: Sanford Cobb, Lakeland; Terrence M. Conder, Stillwater; Dennis F. Vanderwerf, College Grove, all of Minn.

[73] Assignee: Minnesota Mining and Manufacturing Company, St. Paul, Minn.

[21] Appl. No.: 29,706

[22] Filed: Apr. 11, 1979

[51] Int. Cl.² ........................................... G03B 21/60
[52] U.S. Cl. .................................... 350/126; 350/129
[58] Field of Search ............... 350/126, 127, 128, 129

[56] References Cited

U.S. PATENT DOCUMENTS

| | | | |
|---|---|---|---|
| 3,612,650 | 10/1971 | Miyamo et al. | 350/126 |
| 3,712,707 | 1/1973 | Henkes, Jr. | 350/126 X |
| 3,726,583 | 4/1973 | Fujisaki et al. | 350/126 |
| 3,811,750 | 5/1974 | Coulthard | 350/129 X |
| 3,844,644 | 10/1974 | Martinez | 350/129 X |
| 3,893,748 | 7/1975 | DePalma et al. | 350/128 |
| 3,964,822 | 6/1976 | Yamashita | 350/129 X |
| 4,068,922 | 1/1978 | Dotsko | 350/126 |
| 4,089,587 | 5/1978 | Schudel | 350/125 |

*Primary Examiner*—Richard A. Wintercorn
*Attorney, Agent, or Firm*—Cruzan Alexander; Donald M. Sell; William D. Bauer

[57] ABSTRACT

A high gain, front projection screen with controlled light distribution, comprising a translucent sheet containing light diffusing particles, having a matte-finished front surface and an incremental reflector rear surface.

5 Claims, 4 Drawing Figures

DIRECTIONAL FRONT PROJECTION SCREEN

BACKGROUND OF THE INVENTION

1. Field of the Invention

This invention relates to a directional front projection screen.

2. Description of the Prior Art

A front projection screen receives a projected image from a lens and redirects this image to individual viewing zones which make up a larger viewing area.

Early front projection screens took the form of an opaque Lambertian white surface which reflected the projected image to a wide viewing area. Brighter portions of the image were reflected by the white surface to the viewers, whereas, the darker portions of the image were formed by the absence of light in the room. Consequently, the contrast ratio of the image depended upon the reflectivity of the screen and the ambient light level in a viewing room. Although this type of screen allows uniform brightness, light is reflected outside of the normal viewing range and consequently was inefficient.

Next, small glass beads were incorporated onto the the white surface which increased the reflectivity of the surface in the usable viewing area. This increase in reflecting efficiency is referred to as the gain of the screen. Although the beaded surface offered an improvement in optical performance, the material itself was subject to degradation with age and was easily injured.

The next development was the silver lenticular screen which had a reflective silvered surface corrugated for the purpose of expanding the horizontal viewing field by controlling direction of reflected light in the horizontal plane. This improved image contrast under high ambient light condition. The silvered lenticular screen offered lower gain than the beaded surfaces, however, it offered an improvement in terms of durability. This screen does not achieve the uniformity of brightness.

SUMMARY OF THE INVENTION

The front projection screen of the present invention comprises a translucent layer on top of or in a sheet or screen which incorporates light diffusing particles.

The front or first surface of the screen has a matte-finish to reduce specular reflection.

The second surface of the screen is configured as an incremental reflector.

In one embodiment, the facets which form the reflector are oriented to direct an image to a small audience occupying a narrow viewing zone.

In an alternate embodiment the facets which form the reflector are oriented to direct an image to a relatively large audience occupying a wide viewing area consisting of a number of viewing zones.

In this alternate embodiment the facets are arranged in clusters. Each cluster consists of a specified number of adjacent facets. Each facet within a cluster is oriented to direct light toward a different location or zone within the viewing area.

DETAILED DESCRIPTION OF THE PREFERRED EMBODIMENTS

Figure 1:
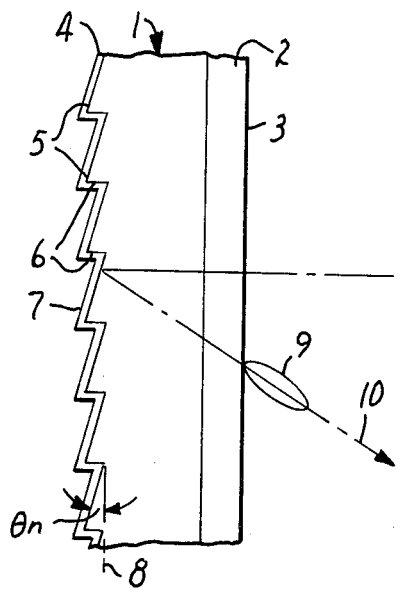
FIG. 1 is a cross-sectional view of the projection screen of the present invention.

FIG. 1 is a cross-section showing the structure of the present invention. The screen 1 is formed from a sheet incorporating translucent layer 2 containing a large number of light diffusing particles. This layer may be located within the sheet or coated onto the sheet. The first surface 3 of the sheet has a matte-finish to reduce specular reflection at this surface. This surface may be embossed or coated to achieve the matte finish.

The second or rear surface 4 is configured as a linear incremental specular reflector. The facets 5 of this incremental surface are separated by riser steps 6. A reflective material 7 such as aluminum is coated onto the rear surface 4 of the sheet to achieve a specularly reflective surface. Each facet is inclined at an angle $\theta_N$ varying with respect to a base line 8 which is parallel to the front surface 3 of the sheet.

For design purposes, geometric ray tracing techniques are used to calculate the desired angle $\theta_N$ for each facet. For these calculations the effect of the diffusing particles is ignored. Once the geometry of screen has been established the effect of the diffusing material is considered by superimposing a diffuse scattering lobe 9 around each of the design rays 10 at the exit point on the first surface of the screen.

Figure 2:
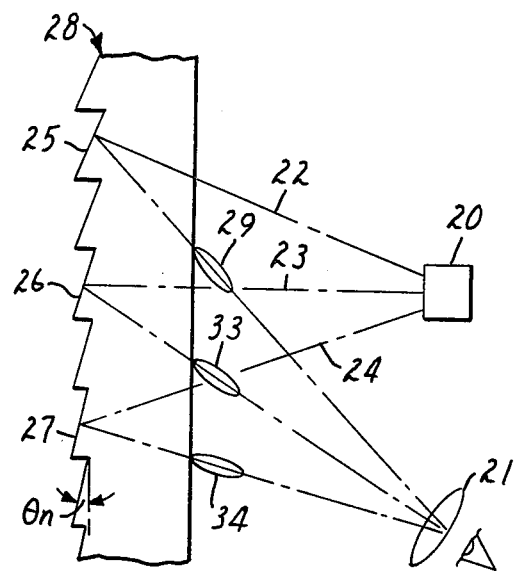
FIG. 2 is a cross-section of the first embodiment of the present invention.

The embodiment shown in FIG. 2 is used when the image projected from a source 20 is to be viewed by a small audience located in a narrow viewing zone 21.

In this instance the angle $\theta_N$ for any given facet is selected to direct light toward the specified viewing zone 21.

For example, rays 22, 23, 24 incident upon facets 25, 26, 27 located at various locations on screen 28 are directed toward viewing zone 21 by selection of an appropriate $\theta$ for each of these facets.

In this embodiment the scattering effect represented by lobes 29, 33, 34 of the diffusion material of screen 28 define the size of viewing zone 21.

Figure 3:
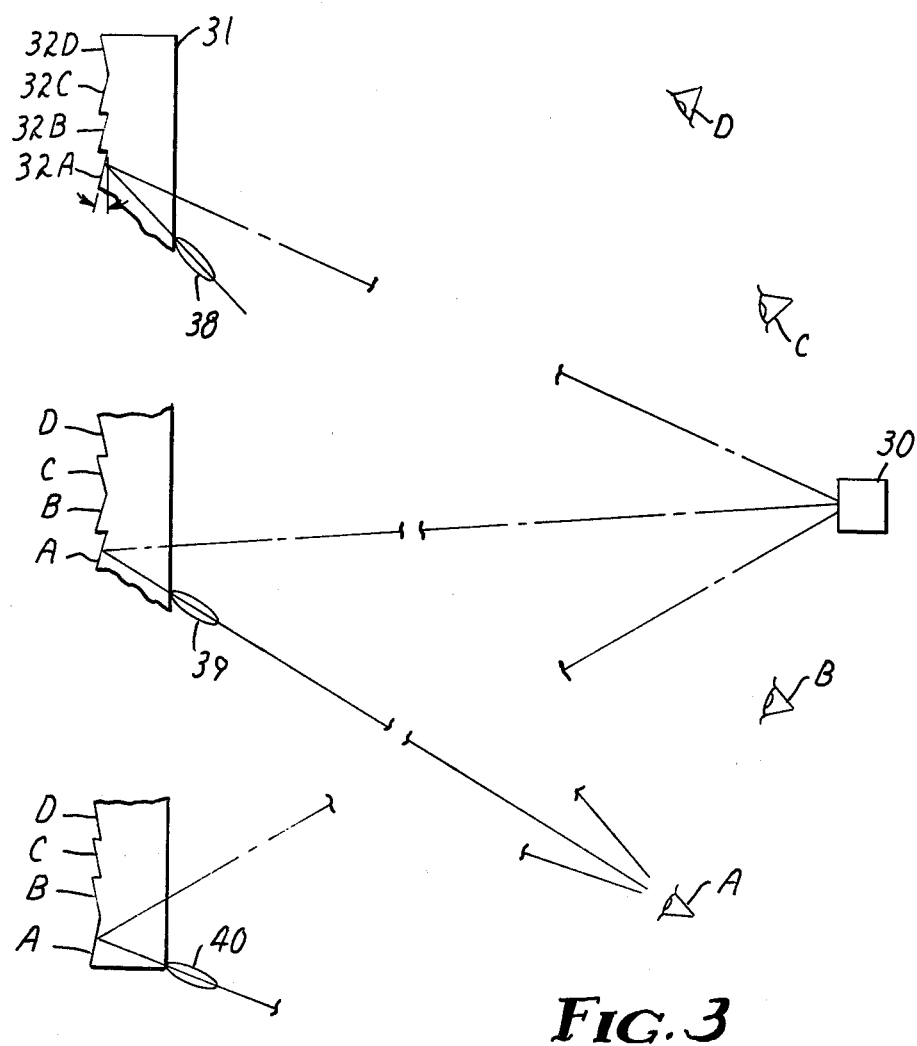
FIG. 3 is a cross-section of the second embodiment of the present invention.

The embodiment shown in FIG. 3 is used when the image projected from source 30 is to be viewed by a larger number of observers located throughout the viewing area. Each observer A, B, C, D defines a selected viewing zone used for design calculations. The aggregate of viewing zones defines the useful viewing area.

For a typical projection T.V. application the incremental facets would extend vertically up and down on the screen. The screen itself may be slightly curved in the vertical plane to direct more light toward the audience. However, the horizontal distribution of light is determined by the facets. This simple one dimensional curvature is an advance over more complex compound curve screens.

The facets of screen 31 in this embodiment are arranged in clusters. Each cluster, 32, for example, includes a specified number of facets 32A, 32B, 32C, and 32D. Each facet is inclined at an angle $\theta_N$ to direct a portion of the image to particular viewing zone. For example, facet 32A of cluster 32 is inclined at an angle $\theta$ such that it directs an incident ray toward viewing zone A. In a similar fashion facets 33A and 34A direct incident rays 36, 37 toward viewing zone A. In this manner individual facets located in various cluster located throughout the screen cooperate to selectively direct light to specified viewing locations.

The effect of the diffusing material incorporated in screen 31 is to blend the viewing zones into an approximately uniformly illuminated viewing area, such that the screen appears equally bright for all observers within the viewing area. The width of facets is dependent on the use of the screen. In general they are too small to be resolved by the veiwer. This contrasts sharply with prior art Lambertion screens in which screen brightness drops off rapidly as one moves away from the principal axis of the screen.

Figure 4:
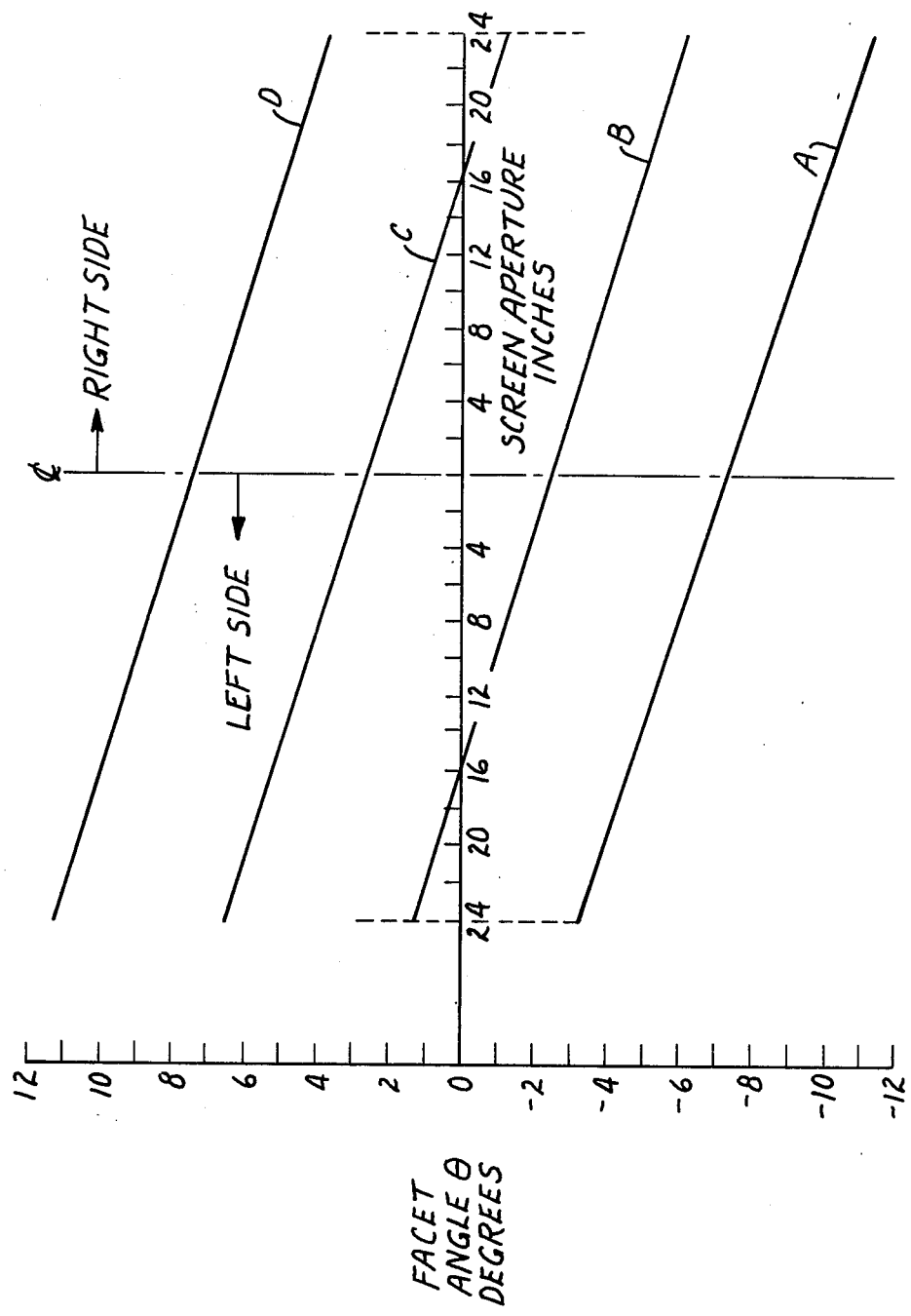
FIG. 4 is a nomograph showing the facet angles for the second embodiment of the present invention.

The shape of the diffusion lobes 38, 39, 40 depict the angular distribution of light or brightness around a selected ray. The shape of these distribution lobes is determined by concentration and type of diffusing material incorporated in screen 31. FIG. 4 is a nomograph showing the facet angles as a function of screen position for a specific design.

One suitable formulation for a screen according to this invention is given in the following example.

EXAMPLE

A composition containing 95 percent by weight of a medium hard cellulose acetate butyrate polymer and 5 percent by weight to lamellar microform quartz particles, was extruded on a 1.91 cm (0.75") Brabender extruder (manufactured by C. W. Brabender Instruments, Inc., Hackensack, NJ) into 0.0254 cm (0.010 inch), 0.0381 cm (0.015 inch) and 0.0508 (0.020 inch) thick film at the following temperature conditions;

Zone 1 at 180° C., Zone 2 at 195° C., Zone 3 at 210° C., Zone 4 at 200° C. and die at 200° C.

In a secondary platen pressing compression molding cycle, one side of each film was thermally embossed with a nickel electro-formed stamper containing a specially designed Fresnel lens while the opposite side was embossed with a chrome steel backplate containing a matte finish.

The compression molding was conducted in a steam heated-water cooled Wabash hydraulic press (Model 12-12-ST manufactured by Wabash Metal Products Company, Inc., Hydraulic Divison, Wabash, Ind.) to a maximum temperature of 143° C. (290° F.) and 14.1 kg per square centimeter (200 pounds per square inch) with a complete cycle time of approximately five minutes. The sandwich was cooled to 60° C. (140° F.), removed from the press, and separated from the stamper and backplate. The grooved surface was vapor deposited with 800 and 1000 A thickness of aluminum. An adhesive may be applied to the rear surface mechanically attaches the screen to a substrate.

The screen luminance and image contrast were determined according to ANSI/NMA MS-12 standard and compared to a metallic lacquer coated screen while mounted in a Realist "Valiant" projector (manufactured by Realist).

|  | CNTR | AVG. INT* | AVG. CORNER* TOP | BOTTOM | CONTRAST |
|---|---|---|---|---|---|
| 10 Mil | 200 | 53 | 18 | 18 | 47 |
| 15 Mil | 139 | 61 | 26 | 31 | 36 |
| 20 Mil | 91 | 73 | 43 | 44 | 42 |
| Lacquer | 43 | 33 | 8 | 25 | 19 |

*As a percentage of the Center in foot lamberts, intermediate and corner spots.

This is in sharp distinction with conventional prior art screens in which image brightness drops off as one moves away from the principal axis or projection axis of the screen.

As the thickness or amount of silica increases, the center brightness decreases, but the screen becomes more uniformly illuminated. The screen contrast of the diffusion Fresnel lens screen, for all film thicknesses, is approximately double that of the conventional reflecting lacquer screen.

It is also important to note that the Fresnel lens is designed in such a manner that the average screen top and screen bottom luminance values become uniform, while in the reflecting lacquer screen the screen top luminance is only one third that of the bottom. Thus the Fresnel lens has redirected the majority of the reflected light for off axis viewing.

To further enhance the uniformity of illumination, the screen of either embodiment may be curved slightly to control light distribution in the plane not controlled by the incremental surface.

Thus, to any single observer within the viewing area, the screen will appear uniformly bright, both from side-to-side and from top-to-bottom.

What is claimed is:
1. A front projection screen comprising,
   a sheet incorporating a translucent layer of light diffusing particles, said sheet having first and second major surfaces,
   said first surface having a matte surface finish for reducing specular reflection from said first surface,
   said second surface configured as an incremental specular reflector for directing reflected light to at least one viewing zone.
2. The front projection screen of claim 1 wherein said incremental reflector comprises a linear array of inclined facets for directing light to at least one viewing zone.
3. The front projection screen of claim 2 wherein said facets are inclined to redirect projected light toward a single viewing zone.
4. The front projection screen of claim 2 wherein
   said facets are arranged in a plurality of clusters,
   each of said clusters contains a defined number of adjacent facets,
   each facet within a cluster is inclined to redirect light toward specific viewing zones, to achieve a desired light distribution in conjunction with the diffusing layer.
5. The front projection screen of claim 1 or 2 further includng an adhesive located on said rear surface for mounting said screen on a substrate.

* * * * *